United States Patent
Kawano et al.

(10) Patent No.: US 12,473,428 B2
(45) Date of Patent: Nov. 18, 2025

(54) EPOXY RESIN MIXTURE, EPOXY RESIN COMPOSITION AND CURED PRODUCT OF SAME

(71) Applicant: NIPPON KAYAKU KABUSHIKI KAISHA, Tokyo (JP)

(72) Inventors: Yusuke Kawano, Tokyo (JP); Masataka Nakanishi, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 643 days.

(21) Appl. No.: 17/780,995

(22) PCT Filed: Jan. 20, 2021

(86) PCT No.: PCT/JP2021/001905
§ 371 (c)(1),
(2) Date: May 30, 2022

(87) PCT Pub. No.: WO2021/149736
PCT Pub. Date: Jul. 29, 2021

(65) Prior Publication Data
US 2022/0411627 A1 Dec. 29, 2022

(30) Foreign Application Priority Data
Jan. 22, 2020 (JP) ................. 2020-008404

(51) Int. Cl.
*C08L 63/00* (2006.01)
*C08G 59/06* (2006.01)
*C08G 59/50* (2006.01)
*C08J 5/04* (2006.01)
*C08J 5/24* (2006.01)

(52) U.S. Cl.
CPC ........... *C08L 63/00* (2013.01); *C08G 59/063* (2013.01); *C08G 59/50* (2013.01); *C08J 5/042* (2013.01); *C08J 5/243* (2021.05); *C08J 2363/00* (2013.01)

(58) Field of Classification Search
CPC .. C08L 63/00; C08J 5/243; C08J 5/042; C08J 2363/00; C08G 59/063; C08G 59/50
USPC ........................................................ 528/93
See application file for complete search history.

(56) References Cited

U.S. PATENT DOCUMENTS

| | | | |
|---|---|---|---|
| 5,418,266 A | 5/1995 | Shiobara et al. | |
| 2017/0240690 A1 | 8/2017 | Hirota et al. | |
| 2017/0275416 A1* | 9/2017 | Morinaga | ............ C08G 59/025 |

FOREIGN PATENT DOCUMENTS

| | | | | |
|---|---|---|---|---|
| CN | 103906782 | | 7/2014 | |
| JP | S6220206 | | 5/1987 | |
| JP | H05175365 | | 7/1993 | |
| JP | H05230180 | | 9/1993 | |
| JP | H05299537 | | 11/1993 | |
| JP | 2013056987 | | 3/2013 | |
| JP | 2015209489 A | * | 11/2015 | ............... C08G 8/00 |
| JP | 2016169314 A | * | 9/2016 | ............. C08G 18/58 |
| WO | WO-2013187184 A1 | * | 12/2013 | ......... C08G 59/3272 |
| WO | 2016204173 | | 12/2016 | |
| WO | WO-2017163129 A1 | * | 9/2017 | |

OTHER PUBLICATIONS

Mitsubishi Chemical Corporation, "jER Epoxy resins", Apr. 2021. (Year: 2021).*
DIC Corporation, https://www.dic-global.com/en/products/epoxy/phenol_mn/, accessed Dec. 7, 2024. (Year: 2024).*
Okazaki et al., JP 2016-169314 A machine translation in English, Sep. 23, 2016. (Year: 2016).*

(Continued)

*Primary Examiner* — David T Karst
(74) *Attorney, Agent, or Firm* — JCIPRNET

(57) ABSTRACT

An epoxy resin mixture which contains an epoxy resin represented by Formula (1) below and an epoxy resin represented by Formula (2) below at a weight ratio of 1:5 to 1:0.2. (In Formula (1), plural R1's each exist independently and represent a hydrogen atom or a C1-10 alkyl group, n represent a real number of 1 to 10, and G represents a substituted or unsubstituted glycidyl group.) (In Formula (2), plural R2's and R3's each exist independently and represent a hydrogen atom or a C1-10 alkyl group, n represents a real number of 1 to 10, and G represents a substituted or unsubstituted glycidyl group.).

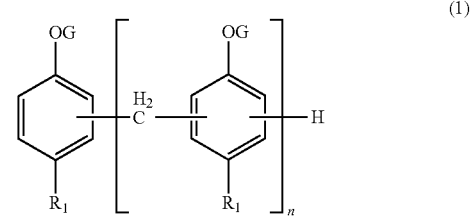

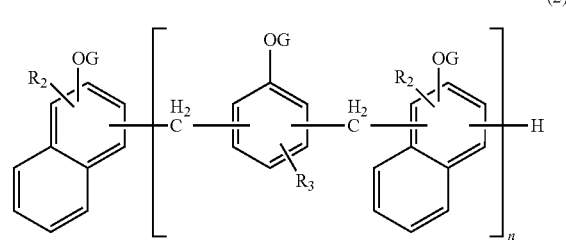

9 Claims, No Drawings

(56) References Cited

OTHER PUBLICATIONS

Takuwa et al., JP 2015-209489 A machine translation in English, Nov. 24, 2015. (Year: 2015).*
Miyake et al., WO 2013/187184 A machine translation in English, Feb. 4, 2016. (Year: 2016).*
"Search Report of Europe Counterpart Application", issued on Aug. 30, 2023, p. 1-p. 6.
"Office Action of China Counterpart Application", issued on Nov. 30, 2023, with English translation thereof, pp. 1-12.
"International Search Report (Form PCT/ISA/210) of PCT/JP2021/001905," mailed on Mar. 16, 2021, with English translation thereof, pp. 1-4.
"International Preliminary Report On Patentability of PCT/JP2021/001905; this report contains the following items: Form PCT/IB/326, PCT/IB/338, PCT/IB/373, PCT/ISA237(cover sheet), PCT/ISA237(Box No. I), PCT/ISA237(Box No. V)", mailed on Aug. 4, 2022, Jul. 26, 2022 and Mar. 16, 2021, which is English translation of "Written Opinion of the International Searching Authority", p. 1-p. 9.
"Office Action of China Counterpart Application", issued on Aug. 5, 2024, with English translation thereof, p. 1-p. 7.

* cited by examiner

EPOXY RESIN MIXTURE, EPOXY RESIN COMPOSITION AND CURED PRODUCT OF SAME

CROSS-REFERENCE TO RELATED APPLICATION

This application is a 371 application of the international PCT application serial no. PCT/JP2021/001905, filed on Jan. 20, 2021, which claims the priority benefit of Japan application no. 2020-008404, filed on Jan. 22, 2020. The entirety of each of the above-mentioned patent applications is hereby incorporated by reference herein and made a part of this specification.

TECHNICAL FIELD

The present invention relates to an epoxy resin mixture suitable for a carbon fiber-reinforced composite material, an epoxy resin composition, a prepreg in which these are used, and the carbon fiber-reinforced composite material obtained by curing the prepreg.

BACKGROUND ART

An epoxy resin is cured with various curing agents to become a cured product having excellent mechanical properties, water resistance, chemical resistance, heat resistance, electrical properties, and the like, and is used in a wide range of fields such as an adhesive, a coating material, a laminated plate, a molding material, and a casting material. Since a carbon fiber-reinforced composite material (CFRP) obtained by impregnating an epoxy resin and a curing agent into reinforced fibers as a matrix resin and curing it has characteristics such as weight reduction and high strength, it has been recently widely developed for computer applications such as a member for an aircraft structure, a blade of a windmill, an automobile outer plate, and a housing for an IC tray or a notebook computer, and demand therefor is increasing. In particular, an epoxy resin is used in a matrix resin for aircraft applications by making use of characteristics such as weight reduction and high strength of a molded body thereof.

In general, examples of resins used in matrix resins such as a CFRP include materials such as a bisphenol A-type epoxy resin, a bisphenol F-type epoxy resin, and tetraglycidyl(diaminodiphenylmethane). In addition, glycidyl amine type epoxy resins such as tetraglycidyl(diaminodiphenylmethane) are used in aircraft applications.

In recent years, with the expansion of CFRPs, characteristics required for a matrix resin have become stricter, and in a case where a CFRP is applied to structural materials for aerospace applications or vehicles, heat resistance at 180° C. or higher is required (Patent Literature 1). Although a glycidyl amine-based material has a high heat resistance, it has problems of a high water absorption rate and deterioration in characteristics after water absorption. On the other hand, a general glycidyl ether epoxy resin has a relatively low water absorption rate, but it has a problem of a low elastic modulus. For this reason, a material having high heat resistance, a high elastic modulus, a high strength, and a low water absorption rate is required.

As one of the known epoxy resins in the related art, there is an epoxy resin using a naphthol novolac as a raw material (Patent Literature 2). However, since this epoxy resin has a high melt viscosity and a high viscosity, the resin cannot be impregnated into every corner of a carbon fiber composite material when it is impregnated into the carbon fiber, whereby a non-uniform prepreg is formed, resulting in a decrease in mechanical strength of the carbon fiber composite material.

CITATION LIST

Patent Literature

[Patent Literature 1]
  PCT International Publication No. WO 2016/204173
[Patent Literature 2]
  Japanese Examined Patent Application, Second Publication No. S62-20206

SUMMARY OF INVENTION

Technical Problem

As a usual method of lowering the melt viscosity of an epoxy resin, there is a method of adding a second epoxy resin. Regarding such typical epoxy resins, a bisphenol F-type epoxy resin and a bisphenol A-type epoxy resin which are liquid epoxy resins have been examined. In a case where a liquid epoxy resin is used, the melt viscosity of epoxy resins mixed with each other can be reduced. However, a cured product thereof has a low heat resistance, and therefore cannot be used as a carbon fiber composite material used for aerospace applications, vehicles, or the like. In addition, in a method of adding an epoxy resin, such as an epoxy resin of 4,4'-biphenol or an epoxy resin of tetramethylbiphenol, having a small molecular weight, it is possible to lower the melt viscosity after mixing. However, this causes a decrease in elastic modulus of a cured product thereof, which leads to a decrease in mechanical strength of a carbon fiber composite material.

The present invention has been made in consideration of the above-described problems, and an objective of the present invention provides an epoxy resin mixture which has a low melt viscosity and of which a cured product has excellent high heat resistance, high elastic modulus, and low water absorptivity, an epoxy resin composition, a prepreg, a resin sheet, and a carbon fiber-reinforced composite material.

Solution to Problem

The present inventors have conducted extensive studies, and as a result, have found that a cured product of a mixture of a naphthol-cresol epoxy resin and a para-cresol novolac epoxy resin which has a specific structure has excellent high heat resistance, high elastic modulus, high strength, low water absorptivity, and flame retardancy, thus leading to realization of the present invention.

That is, the present invention is shown in the following [1] to [8].

[1]

An epoxy resin mixture which contains an epoxy resin represented by Formula (1) below and an epoxy resin represented by Formula (2) below at a weight ratio of 1:5 to 1:0.2.

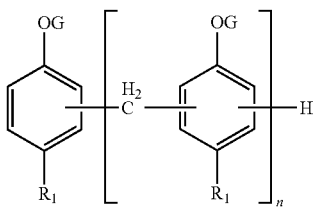

(In Formula (I), plural $R_1$'s each exist independently and represent a hydrogen atom or a C1-10 alkyl group, n represents a real number of 1 to 10, and G represents a substituted or unsubstituted glycidyl group.)

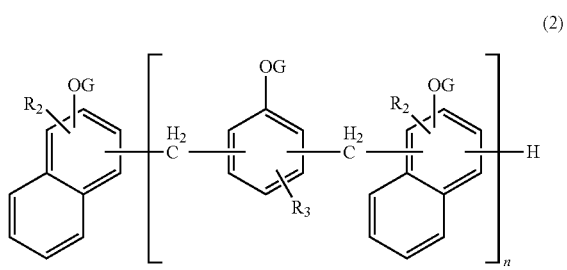

(In Formula (2), plural $R_2$'s and $R_3$'s each exist independently and represent a hydrogen atom or a C1-10 alkyl group, n represents a real number of 1 to 10, and G represents a substituted or unsubstituted glycidyl group.)

[2]
The epoxy resin mixture according to the preceding paragraph [1], which is obtained through a reaction between a phenolic resin represented by Formula (3) below, a phenolic resin represented by Formula (4) below, and an epihalohydrin.

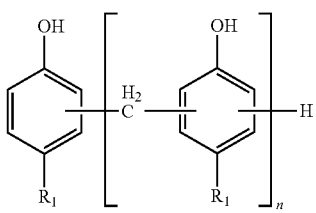

(In Formula (3), plural $R_1$'s each exist independently and represent a hydrogen atom or a C1-10 alkyl group, and n represents a real number of 1 to 10.)

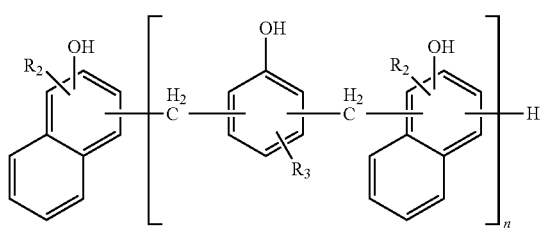

(In Formula (4), plural $R_2$'s and $R_3$'s each exist independently and represent a hydrogen atom or a C1-10 alkyl group, and n represents a real number of 1 to 10.)

[3]
An epoxy resin composition including: the epoxy resin mixture according to the preceding paragraph [1] or [2]; and a curing agent.

[4]
The epoxy resin composition according to the preceding paragraph [3], in which the curing agent is an amine-based curing agent.

[5]
The epoxy resin composition according to the preceding paragraph [3] or [4], which is for a carbon fiber-reinforced composite material.

[6]
A resin sheet obtained by coating a support substrate with the epoxy resin composition according to any one of the preceding paragraphs [3] to [5].

[7]
A prepreg obtained by impregnating the epoxy resin composition according to any one of the preceding paragraphs [3] to [5] or the resin sheet according to [6] into carbon fibers.

[8]
A carbon fiber-reinforced composite material obtained by curing the prepreg according to the preceding paragraph [7].

Advantageous Effects of Invention

According to the present invention, it is possible to provide an epoxy resin mixture of which a cured product has a high elastic modulus, an epoxy resin composition, a resin sheet using the epoxy resin composition, a prepreg, and a carbon fiber-reinforced composite material.

DESCRIPTION OF EMBODIMENTS

An epoxy resin mixture of the present invention contains an epoxy resin represented by Formula (1) below and an epoxy resin represented by Formula (2) below.

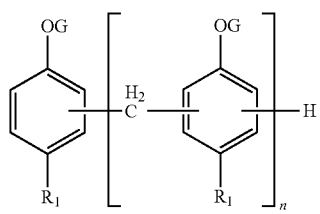

(In Formula (1), plural $R_1$'s each exist independently and represent a hydrogen atom or a C1-10 alkyl group, n represents a real number of 1 to 10, and G represents a substituted or unsubstituted glycidyl group.)

In Formula (1). $R_1$ is a hydrogen atom or a C1-10 alkyl group, preferably a C1-10 alkyl group, still more preferably a C1-3 alkyl group, and particularly preferably a methyl group. In addition, the substitution position with respect to an OH group is preferably the ortho-position or the para-position and particularly preferably the para-position.

In a case where the substitution position is the para-position, when the epoxy resin reacts with a curing agent, the epoxy resin has a structure densely filled with a network of a cured product thereof and has a high flexural modulus, which is preferable.

In Formula (1), n is a real number of 1 to 10, preferably a real number of 1 to 8, and more preferably a real number of 2 to 6. The value of n can be calculated from a value of a weight average molecular weight (Mw) obtained through gel permeation chromatography (GPC) measurement of olefin compounds.

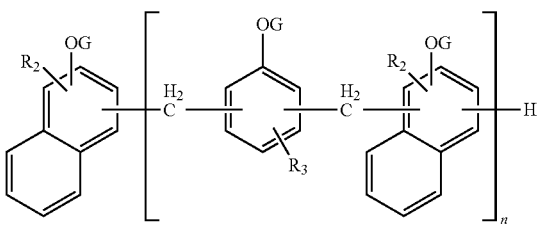

(In Formula (2), plural $R_2$'s and $R_3$'s each exist independently and represent a hydrogen atom or a C1-10 alkyl group, n represents a real number of 1 to 10, and G represents a substituted or unsubstituted glycidyl group.)

In Formula (2), $R_2$ is a hydrogen atom and a C1-10 alkyl group, preferably a hydrogen atom or a C1-3 alkyl group, and particularly preferably a hydrogen atom.

Regarding raw material naphthol in Formula (2), α-naphthol and β-naphthol can be used, and α-naphthol is preferable. In a case where β-naphthol is used as a resin raw material, a β-naphthol moiety is dissociated through high-temperature heating and a dimer of β-naphthol is produced. This causes a decrease in heat resistance, which is not preferable.

In Formula (2), $R_3$ is a hydrogen atom or a C1-10 alkyl group, preferably a C1-10 alkyl group, still more preferably a C1-3 alkyl group, and particularly preferably a methyl group. In addition, the substitution position with respect to an OH group is preferably the ortho-position or the para-position and particularly preferably the para-position.

It can be stated that, in a case where the substitution position is the para-position, when the epoxy resin reacts with a curing agent, the epoxy resin has a structure densely filled with a network of a cured product thereof and has a high flexural modulus, which is preferable.

In Formula (2), n is a real number of 1 to 10, preferably a real number of 1 to 6, and more preferably a real number of 1 to 4.

The epoxy resin represented by Formula (1) can be obtained through a reaction between epihalohydrins and the phenolic resin represented by Formula (3) below.

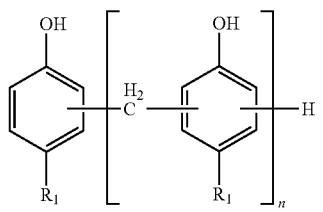

(In Formula (3), plural $R_1$'s each exist independently and represent a hydrogen atom or a C1-10 alkyl group, and n represents a real number of 1 to 10.)

The preferred ranges of $R_1$ and n in Formula (3) are the same as those in Formula (1).

In Formula (3), a content of a component (binuclear body) represented by n=1 as measured by gel permeation chromatography (GPC) is generally less than 10% by area. The lower limit value may be 0% by area, but is preferably greater than or equal to 1% by area and more preferably greater than or equal to 2% by area. In addition, the upper limit value is preferably less than 8% by area and more preferably less than 6% by area.

In Formula (3), the melt viscosity of the epoxy resin reacted with epihalohydrins is excellent due to a high number of components represented by n=1, but the heat resistance of the epoxy resin-cured product is low due to a high number of bifunctional components. On the other hand, in the case where the content of components represented by n=1 is less than 10% by area, the content of polyfunctional components is relatively high. Therefore, the heat resistance of the epoxy resin-cured product is high.

In Formula (3), a content of a component (trinuclear body) represented by n=2 as analyzed by gel permeation chromatography (GPC) is generally greater than or equal to 1% by area and less than 60% by area, preferably greater than or equal to 10% by area and less than 50% by area, and is more preferably greater than or equal to 20% by area and less than 40% by area.

In Formula (3), in a case where the content of a component represented by n=2 is greater than or equal to 1% by area, the viscosity becomes appropriate, and therefore the handleability improves. On the other hand, in a case where the content of a component represented by n=2 is less than 40% by area, the heat resistance improves.

In Formula (3), the total content of a component (binuclear body) represented by n=1 and a component (tetranuclear body) represented by n=3 as measured by gel permeation chromatography (GPC) is generally greater than or equal to 1% by area and less than 20% by area. The lower limit value is preferably greater than or equal to 5% by area and more preferably greater than or equal to 10% by area. In addition, the preferred upper limit value is less than 18% by area.

In Formula (3), in the case where the total content of components represented by n=1 and 3 is greater than or equal to 1% by area, the content of low-molecular-weight components is large, and therefore the melt viscosity of the resin is excellent. In addition, the component represented by n=3 is polyfunctional, and therefore, the heat resistance of the epoxy resin-cured product is high. On the other hand, in the case where the total content of such components is less than 20% by area, the melt viscosity is not too high, and the epoxy resin-cured product exhibits high heat resistance.

In Formula (3), the total content of a component (trinuclear body) represented by n=2 and a component (pentanuclear body) represented by n=4 as measured by gel permeation chromatography (GPC) is generally greater than or equal to 10% by area and less than 80% by area. The lower limit value is preferably greater than or equal to 25% by area and more preferably greater than or equal to 30% by area. In addition, the preferred upper limit value is less than 70% by area.

In Formula (3), in the case where the total content of components represented by n=2 and 4 is greater than or equal to 10% by area, the content of low-molecular-weight components is high, and therefore the melt viscosity of the resin is excellent. In addition, the component represented by n=4 is polyfunctional, and therefore the heat resistance of the epoxy resin-cured product is high. On the other hand, in the case where the total content of such components is less than 80% by area, the melt viscosity is not too high, and the epoxy resin-cured product exhibits high heat resistance.

GPC analysis is conducted under the following conditions.

In the present invention, GPC analysis is conducted under the following conditions.

[Various Conditions of GPC]
Manufacturer: Waters
Column: Guard Column SHODEX GPC KF-601 (2 columns), KF-602, KF-602.5, KF-603
Flow rate: 1.23 ml/min
Column temperature: 25° C.
Solvent used: Tetrahydrofuran (THF)
Detector: Differential refraction detector (RI)

The epoxy resin represented by Formula (2) can be obtained through a reaction between epihalohydrins and the phenolic resin represented by Formula (4) below.

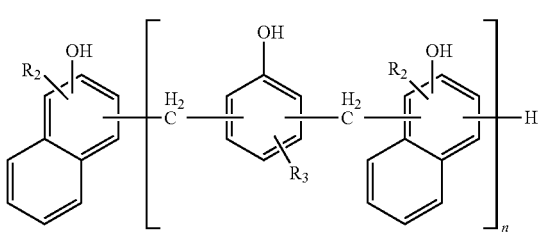

(In Formula (4), plural $R_2$'s and $R_3$'s each exist independently and represent a hydrogen atom or a C1-10 alkyl group, and n represents a real number of 1 to 10.)

The preferred ranges of $R_2$, $R_3$, and n in Formula (4) are the same as those in Formula (2).

The epoxy resin mixture of the present invention contains an epoxy resin (hereinafter, also referred to as a "component A") represented by Formula (1) and an epoxy resin (hereinafter, also referred to as a "component B") represented by Formula (2) at a weight ratio of 1:5 to 1:0.2, preferably at a weight ratio of 1:5 to 1:0.2, more preferably at a weight ratio of 1:3 to 1:0.5, and particularly preferably at a weight ratio of 1:2 to 1:1. If the amount of component A is small, the epoxy resin mixture has a high viscosity and becomes difficult to handle. If the amount of component B is small, the heat resistance of the epoxy resin mixture decreases. The viscosity of the epoxy resin mixture can be adjusted to be suitable for the process based on the ratio of the component A to the component B. When the epoxy resin mixture is used as a matrix resin of a prepreg of a CFRP, the amount of the component A added can be increased to produce a prepreg having an excellent tackiness.

The epoxy equivalent of the epoxy resin mixture of the present invention is preferably 200 to 300 g/eq., more preferably 205 to 260 g/eq., and still more preferably 210 to 240 g/eq. In the case where the epoxy equivalent is within the above-described ranges, the amount of epoxy group per unit structure becomes appropriate, which is preferable in terms of heat resistance.

The epoxy resin mixture of the present invention has a resinous form having a softening point. Here, the softening point is preferably 60° C. to 120° C., more preferably 70° C. to 110° C., and still more preferably 80° C. to 100° C. A softening point of higher than or equal to 60° C. means that the molecular weight distribution is appropriate or there is no residual solvent or the like. In addition, the heat resistance becomes favorable, and problems such as poor curing, voids during molding, and the like can be curbed. On the other hand, in the case where the softening point is lower than or equal to 100° C., handling during kneading with other resins becomes favorable.

In addition, the melt viscosity is preferably 0.2 to 1.0 Pa·s (an ICI melt viscosity (at 150° C.), a cone-and-plate method), more preferably 0.3 to 0.8 Pa·s, and still more preferably 0.4 to 0.6 Pa·s. In the case where the viscosity is greater than or equal to 0.2 Pa·s, the molecular weight distribution becomes appropriate, and the solubility in a solvent becomes favorable. On the other hand, in the case where the melt viscosity is less than or equal to 1.0 Pa·s, handling during kneading with other resins becomes favorable.

Subsequently, the reaction for obtaining the epoxy resin mixture of the present invention will be described.

The method for obtaining the epoxy resin mixture of the present invention is a method for mixing a component A obtained by reacting an epihalohydrin with the phenolic resin represented by Formula (3) with a component B obtained by reacting an epihalohydrin with the phenolic resin represented by Formula (4), or a method for mixing the phenolic resin represented by Formula (3) with the phenolic resin represented by Formula (4) and then reacting the mixture with an epihalohydrin.

Examples of the method for mixing the component A with the component B generally include two types of (a) melt mixing and (b) solution mixing.

In the case of (a) melt mixing, the components A and B are melted at 50° C. to 200° C. to prepare a uniform mixture. At this time, if the temperature is low, the components are not uniformly mixed, and there is a high possibility that a resin sticky composition obtained may become sticky or the components may bleed out, which is not preferable. In addition, in a case where the treatment is performed at 200° C. or higher, the treatment is preferably performed under reduced pressure and/or in the presence of an inert gas such as nitrogen.

In the case of (b) solution mixing, it is preferable to uniformly dissolve the components A and B in an organic solvent (for example, C1-C6 ketones such as acetone, methyl ethyl ketone, methyl isobutyl ketone, cyclopentanone, and cyclohexanone, C1-C6 esters such as ethyl acetate, butyl acetate, and propylene glycol monomethyl ester, C1-C10 hydrocarbons such as toluene and xylene, and C1-C6 ethers such as tetrahydrofuran, dioxane, and propylene glycol monomethyl ether) at 50° C. to 200° C., and then to distill off the solvent under heating and reduced pressure to obtain a mixture.

In either case, an epoxy resin mixture is obtained by dropping a uniform epoxy resin mixture onto a surface support (such as steel belt or a drum type flaker) cooled at 0° C. to 100° C. The shape is preferably a flake type or a marble type having a diameter of 1 to 20 mm.

Epihalohydrins used in epoxidation reactions are easily available on the market. The amount of epihalohydrin used with respect to 1 mol of a hydroxyl group of a raw material phenol mixture is usually 3.5 to 10 mol, preferably 4.0 to 8.0 mol, and more preferably 4.5 to 7.0 mol.

In addition, an alkali metal hydroxide can be used as a catalyst for promoting an epoxidation reaction. Examples of alkali metal hydroxides that can be used include sodium hydroxide and potassium hydroxide. A solid matter or an aqueous solution thereof may be used. In the present invention, a solid matter molded into flakes is particularly preferably used from the viewpoints of solubility and handling.

The amount of alkali metal hydroxides used with respect to 1 mole of a hydroxyl group of a raw material phenol mixture is usually 0.90 to 1.5 mol, preferably 0.95 to 1.25 mol, and more preferably 0.99 to 1.15 mol. The reaction temperature at this time is usually 30° C. to 90° C. and preferably 35° C. to 80° C. In particular, in the present invention, the reaction temperature is preferably higher than or equal to 60° C. and particularly preferably higher than or equal to 65° C. for epoxidation with higher purity. Furthermore, it is particularly preferable to perform the reaction under the conditions close to reflux conditions. The reaction time is usually 0.5 to 10 hours, preferably 1 to 8 hours, and particularly preferably 1 to 3 hours. If the reaction time is short, the reaction will not proceed completely, and if the reaction time is long, by-products can be formed, which is not preferable.

In addition, by first adding some alkali metal hydroxides to cause a reaction, an addition reaction between an epihalohydrin and a phenolic resin can proceed to produce a chlorohydrin substance. The preferred amount of alkali metal hydroxide to be added at this time with respect to 1 mole of a hydroxyl group of a raw material phenol mixture is usually 0.01 to 0.7 mol, preferably 0.05 to 0.5 mol, and more preferably 0.10 to 0.30 mol. If the amount of alkali metal hydroxides is small, the reaction does not proceed, and if the amount of alkali metal hydroxides is too large, the reaction proceeds rapidly and the molecular weight of the resin increases, which is not preferable. In addition, it is dangerous because a rapid exothermic reaction occurs, which is industrially unfavorable.

The reaction temperature at this time is usually 30° C. to 90° C. and preferably 35° C. to 80° C. In particular, in the present invention, the reaction temperature is preferably higher than or equal to 60° C. and particularly preferably higher than or equal to 65° C. for epoxidation with higher purity. The reaction time is usually 0.5 to 10 hours, preferably 1 to 8 hours, and particularly preferably 1 to 3 hours. If the reaction time is short, the reaction will not proceed completely, and if the reaction time is long, by-products can be formed, which is not preferable.

In addition, in order to promote the reaction, non-proton type polar solvents such as dimethylformamide and dimethyl sulfoxide or quaternary ammonium salts such as tetramethylammonium chloride, tetramethylammonium bromide, and trimethylbenzylammonium chloride may be added as a catalyst. The amount of quaternary ammonium salt used with respect to 1 mol of a hydroxyl group of a raw material phenol mixture is usually 0.1 to 15 g and preferably 0.2 to 10 g.

After or without washing these reaction products of the epoxidation reaction with water, the epihalohydrin, the solvent, or the like is removed under heating and reduced pressure. Furthermore, in order to obtain epoxy resins having a low content of hydrolyzable halogen, collected epoxy resins can be dissolved in a C4-7 ketone compound (for example, methyl isobutyl ketone, methyl ethyl ketone, cyclopentanone, and cyclohexanone) as a solvent, and a reaction can be caused by adding an aqueous solution of alkali metal hydroxides such as sodium hydroxide or potassium hydroxide to ensure ring closure. In this case, the amount of alkali metal hydroxides used with respect to 1 mole of a hydroxyl group of a raw material phenol mixture used for epoxidation is usually 0.01 to 0.3 mol and preferably 0.05 to 0.2 mol. The reaction temperature is usually 50° C. to 120° C., and the reaction time is usually 0.5 to 2 hours.

After the completion of the reaction, produced salts are removed through filtration, washing with water, or the like, and the solvent is distilled off under heating and reduced pressure to obtain an epoxy resin mixture of the present invention.

The epoxy resin mixture of the present invention obtained in this manner has excellent flexural modulus, heat resistance, and low water absorptivity. The flexural modulus is preferably 3.2 to 3.8 GPa, more preferably 3.3 to 3.7 GPa, and particularly preferably 3.4 to 3.6 GPa. If the flexural modulus is greater than or equal to 3.2 GPa, a mechanical strength required for a carbon fiber composite material can be obtained, so that the material can also withstand reliability tests. In addition, if the flexural modulus is less than or equal to 3.8 GPa, the material becomes tough. Therefore, the material is less likely to break and can also withstand reliability tests.

The heat resistance (Tg) is preferably 180° C. to 300° C., more preferably 190° C. to 270° C., and particularly preferably 200° C. to 250° C. If the heat resistance is higher than or equal to 180° C., even when the material is adapted to members such as engine accessories of aircraft, the high mechanical strength can be maintained without softening resins. In addition, since the heat resistance of epoxy resins generally correlates with cross-linking density, if the heat resistance is too high, the cross-linking density becomes too high and the mechanical strength of cured products sometimes becomes brittle. Therefore, the heat resistance is preferably lower than or equal to 300° C.

Regarding the water absorption rate, the weight increase rate after boiling in water at 100° C. for 72 hours is preferably 0.5% to 1.5%, more preferably 0.7% to 1.4%, and particularly preferably 0.9% to 1.3%. A lower water absorption rate is more preferable. However, generally in many cases, epoxy resins expressing a low water absorption rate have many alkyl groups in their skeleton, and cured products are likely to be brittle. Therefore, the water absorption rate is preferably higher than or equal to 0.5%. In addition, if the water absorption rate is too high, cured products absorb water so that the material significantly softens and the mechanical strength decreases. Therefore, the water absorption rate is preferably lower than or equal to 1.5%.

The epoxy resin composition of the present invention contains a curing agent. Examples of curing agents that can be used include an amine-based curing agent, an acid anhydride-based curing agent, an amide-based curing agent, and a phenolic curing agent.

In the epoxy resin composition of the present invention, an amine curing agent is particularly preferable because both low linear expansion and heat resistance of the epoxy resin composition can be achieved with a good balance. In particular, aniline resins obtained through a reaction of xylylene chloride with an aniline novolac, an orthoethylaniline novolac, and aniline; and aniline resins obtained through polycondensation of aniline with substituted biphenyls (such as 4,4'-bis(chloromethyl)-1,1'-biphenyl and 4,4'-bis(methoxymethyl)-1'-biphenyl), substituted phenyls (such as 1,4-bis(chloromethyl)benzene, 1,4-bis(methoxymethyl)benzene, and 1,4-bis(hydroxymethyl)benzene), or the like are preferable from the viewpoints of strength and heat resistance thereof.

Examples of acid anhydride-based curing agents include phthalic anhydride, trimellitic anhydride, pyromellitic anhydride, maleic anhydride, tetrahydrophthalic anhydride, methyltetrahydrophthalic anhydride, methyl nadic anhydride, hexahydrophthalic anhydride, and methylhexahydrophthalic anhydride.

Examples of amide-based curing agents include dicyandiamide or a polyamide resin synthesized from ethylenediamine and a dimer of linolenic acid.

Examples of phenolic curing agents include polyphenols (such as bisphenol A, bisphenol F, bisphenol S, fluorene bisphenol, terpene diphenol, 4,4'-dihydroxybiphenyl, 2,2'-dihydroxybiphenyl, 3,3',5,5'-tetramethyl-(1,1'-biphenyl)-4,4'-diol, hydroquinone, resorcin, naphthalenediol, tris-(4-hydroxyphenyl) methane, and 1,1,2,2-tetrakis(4-hydroxyphenyl) ethane); phenolic resins obtained through condensation of phenols (for example, phenol, alkyl-substituted phenol, naphthol, alkyl-substituted naphthol, dihydroxybenzene, and dihydroxynaphthalene) with aldehydes (such as formaldehyde, acetaldehyde, benzaldehyde, p-hydroxybenzaldehyde, o-hydroxybenzaldehyde, and furfural), ketones (such as p-hydroxyacetophenone and o-hydroxyacetophenone), or dienes (such as dicyclopentadiene and tricyclopentadiene); phenolic resins obtained through polycondensation of the phenols with substituted phenyls (such as 4,4'-bis(chloromethyl)-1,1'-biphenyl and 4,4'-bis (methoxymethyl)-1,1'-biphenyl) or substituted phenyls (such as 1,4-bis(chloromethyl)benzene, 1,4-bis(methoxymethyl)benzene, and 1,4-bis(hydroxymethyl)benzene); modified products of phenols and/or phenolic resins; and halogenated phenols of tetrabromobisphenol A, brominated phenolic resins, and the like.

The amount of curing agent used in the epoxy resin composition of the present invention is preferably 0.7 to 1.2 equivalents relative to 1 equivalent of epoxy groups of epoxy resins. In either case where the amount thereof is less than 0.7 equivalents or greater than 1.2 equivalents relative to 1 equivalent of epoxy groups, there is a concern that curing may be incomplete and favorable cured product properties may not be obtained.

In addition, a curing promoter may be formulated with the epoxy resin composition of the present invention as necessary. The gelation time can be adjusted by using a curing promoter. Examples of curing promoters that can be used include imidazoles such as 2-methylimidazole, 2-ethylimidazole, and 2-ethyl-4-methylimidazole, tertiary amines such as 2-(dimethylaminomethyl) phenol and 1,8-diaza-bicyclo(5,4,0)undecene-7, phosphines such as triphenylphosphine, and metal compounds such as tin octylate. A curing promoter may be used in an amount of 0.01 to 5.0 parts by weight based on 100 parts by weight of an epoxy resin as necessary.

Other epoxy resins may be formulated with the epoxy resin composition of the present invention in addition to the components A and B. and specific examples thereof include polycondensates of phenols (such as phenol, alkyl-substituted phenol, aromatic-substituted phenol, naphthol, alkyl-substituted naphthol, dihydroxybenzene, alkyl-substituted dihydroxybenzene, and dihydroxynaphthalene) with various aldehydes (such as formaldehyde, acetaldehyde, alkylaldehyde, benzaldehyde, alkyl-substituted benzaldehyde, hydroxybenzaldehyde, naphthaldehyde, glutaraldehyde, phthalaldehyde, crotonaldehyde, and cinnamaldehyde); polymers of phenols and various diene compounds (such as dicyclopentadiene, terpenes, vinylcyclohexene, norbornadiene, vinylnorbornene, tetrahydroindene, divinylbenzene, divinylbiphenyl, diisopropenylbiphenyl, butadiene, and isoprene); polycondensates of phenols and ketones (such as acetone, methyl ethyl ketone, methyl isobutyl ketone, acetophenone, and benzophenone); phenolic resins obtained through polycondensation of phenols with substituted biphenyls (such as 4,4'-bis(chloromethyl)-1,1'-biphenyl and 4,4'-bis(methoxymethyl)-1,1'-biphenyl) or substituted phenyls (such as 1,4-bis(chloromethyl)benzene, 1,4-bis(methoxymethyl)benzene, and 1,4-bis(hydroxymethyl)benzene); polycondensates of bisphenols and various aldehydes; glycidyl ether epoxy resins obtained by glycidylating alcohols; alicyclic epoxy resins represented by 4-vinyl-1-cyclohexene diepoxide, 3,4-epoxycyclohexylmethyl-3,4'-epoxycyclohexanecarboxylate, or the like; glycidyl amine epoxy resins represented by tetraglycidyldiaminodiphenylmethane (TGDDM), triglycidyl-p-aminophenol, or the like; and glycidyl ester epoxy resins. However, the present invention is not limited thereto as long as these are epoxy resins generally used.

In a case where the components A and B are used in combination with other epoxy resins, the amount of the components A and B in the total amount of the epoxy resins is preferably greater than or equal to 30 weight % and particularly preferably greater than or equal to 40 weight %. If the total amount of the components A and B is lower than 30 weight %, physical properties such as high heat resistance, high elastic modulus, and low water absorptivity cannot be obtained.

Well-known additives can also be formulated with the epoxy resin composition of the present invention as necessary. Specific examples of additives that can be used include polybutadiene and modified products thereof, modified products of an acrylonitrile copolymer, polyphenylene ether, polystyrene, polyethylene, polyimide, fluororesins, maleimide compounds, cyanate ester compounds, silicone gel, silicone oil, inorganic fillers such as silica, alumina, calcium carbonate, quartz powder, aluminum powder, graphite, talc, clay, iron oxide, titanium oxide, aluminum nitride, asbestos, mica, and glass powder, surface treatment agents, such as a silane coupling agent, for fillers, releasing agents, and coloring agents such as carbon black, phthalocyanine blue, and phthalocyanine green.

Well-known maleimide compounds can also be formulated with the epoxy resin composition of the present invention as necessary. Specific examples of maleimide compounds that can be used include 4,4'-diphenylmethane bismaleimide, polyphenylmethane maleimide, m-phenylene bismaleimide, 2,2'-bis[4-(4-maleimidophenoxy)phenyl]propane, 3,3'-dimethyl-5,5'-diethyl-4,4'-diphenylmethane bismaleimide, 4-methyl-1,3-phenylene bismaleimide, 4,4'-diphenyl ether bismaleimide, 4,4'-diphenyl sulfone bismaleimide, 1,3-bis(3-maleimidophenoxy)benzene, and 1,3-bis(4-maleimidophenoxy)benzene, but the present invention is not limited thereto. These may be used alone or in combination of two or more thereof. When maleimide compounds are incorporated, a curing promoter is incorporated as necessary. The aforementioned curing promoter or a radical polymerization initiator such as an organic peroxide or an azo compound can be used.

An organic solvent can be added to the epoxy resin composition of the present invention to produce a varnish-like composition (hereinafter, simply referred to as varnish). Examples of solvents that can be used include: γ-butyrolactones; amide-based solvents such as N-methylpyrrolidone, N,N-dimethylformamide, N,N-dimethylacetamide, and N,N-dimethylimidazolidinone; sulfones such as tetramethylene sulfone; ether-based solvents such as diethylene glycol dimethyl ether, diethylene glycol diethyl ether, propylene glycol, propylene glycol monomethyl ether, propylene glycol monomethyl ether acetate, and propylene glycol monobutyl ether; ketone-based solvents such as methyl ethyl ketone, methyl isobutyl ketone, cyclopentanone, and cyclohexanone; and aromatic solvents such as toluene and xylene. A solvent is used in such a range that the solid content concentration excluding the solvent in the obtained varnish is generally 10 to 80 weight %, preferably 20 to 70 weight %.

Next, a resin sheet, a prepreg, and a carbon fiber-reinforced composite material of the present invention will be described.

A single surface or both surfaces of a support substrate may be coated with the epoxy resin composition of the present invention which can be used as a resin sheet. Examples of coating methods include a casting method, a method of extruding a resin from a nozzle or a die with a pump, an extruder, or the like, a method of adjusting a thickness with a blade, a method of adjusting a thickness through calendering with a roll, and a spraying method with a spray or the like. In the step of forming a layer, the formation of a layer may be performed while heating the epoxy resin composition within a temperature range in which thermal decomposition of the epoxy resin composition can be avoided. In addition, rolling processing, grinding processing, and the like may be performed as necessary. Examples of support substrates include: porous substrates made of paper, cloth, non-woven fabric, or the like; plastic films such as polyethylene film, polypropylene film, polyethylene terephthalate film, and a polyester film; sheets; nets; foamed bodies; metal foils; and appropriate thin leaf-like bodies such as laminate bodies thereof, but the present invention is not limited thereto. The thickness of a support substrate is not particularly limited, and can be appropriately determined according to the application.

The prepreg of the present invention can be obtained by heating and melting the epoxy resin composition and/or the resin sheet of the present invention to reduce the viscosity thereof and impregnating the epoxy resin composition and/or the resin sheet of the present invention into a fiber substrate.

In addition, the prepreg of the present invention can also be obtained by impregnating a varnish-like epoxy resin composition into a fiber substrate and performing heating and drying. A carbon fiber-reinforced composite material of the present invention can be obtained by cutting the above-described prepreg into desired shapes, laminating the cut prepreg sheets, and then, heat-curing an epoxy resin composition while applying pressure to the laminated product through a press molding method, an autoclave molding method, a sheet-winding molding method, or the like. In addition, copper foils or organic films can also be laminated during the lamination of the prepreg sheets.

Furthermore, the carbon fiber-reinforced composite material of the present invention can also be obtained through molding through well-known methods in addition to the above-described methods. For example, a resin transfer molding technique (RTM method) in which a carbon fiber substrate (in general, carbon fiber woven fabric is used) is cut, laminated, and shaped to prepare a preform (preliminary molded body before impregnation of a resin), the preform is placed in a molding die which is then closed, a resin is injected thereinto to be impregnated into the preform and is cured, and then, the die is opened to take out the molded product can be used.

In addition, a VaRTM method, a Seeman's composite resin infusion molding process (SCRIMP) method, and a controlled atmospheric pressure resin infusion (CAPRI) method for more appropriately controlling a resin infusion process, particularly the VaRTM method, by evacuating a resin supply tank disclosed in Published Japanese Translation No. 2005-527410 to a pressure lower than atmospheric pressure, using circulation compression, and controlling the net molding pressure, which are kinds of RTM methods can be used, for example.

Furthermore, a film stacking method in which a fiber substrate is sandwiched between resin sheets (films), a method for making a powdery resin adhere to a reinforced fiber substrate for improving impregnation, a molding method (powder-impregnated yarn) in which a fluidized bed or a fluid slurry method is used in the process of mixing a resin with a fiber substrate, and a method for mixing resin fibers with a fiber substrate can also be used.

Examples of carbon fibers include acrylic carbon fibers, pitch-based carbon fibers, and rayon-based carbon fibers, and among these, acrylic carbon fibers having a high tensile strength are preferably used. As the forms of carbon fibers, twisted yarn, untwisted yarn, non-twisted yarn, and the like can be used. Untwisted yarn or non-twisted yarn is preferably used because of a favorable balance between moldability and strength characteristics of a carbon fiber-reinforced composite material.

EXAMPLES

Hereinafter, the present invention will be described more specifically with reference to synthesis examples and examples. Materials, processing contents, processing procedures, and the like shown below can be appropriately changed without departing from the gist of the present invention. Accordingly, the scope of the present invention should not be limitedly interpreted by specific examples shown below.

Various analysis methods used in the examples will be described below.

Epoxy Equivalent

It is measured through a method described in JIS K-7236, and the unit is g/eq.

Softening Point

It is measured through a method according to JIS K-7234, and the unit is ° C.

Gel Permeation Chromatography (GPC) Analysis

Manufacturer: Waters

Column: Guard Column SHODEX GPC KF-601 (2 columns), KF-602, KF-602.5, KF-603

Flow rate: 1.23 ml/min

Column temperature: 25° C.

Solvent used: Tetrahydrofuran (THF)

Detector: Differential refraction detector (RI)

Synthesis Example 1

216 Parts (2 mol) of para-cresol was added to a four-neck flask equipped with a thermometer and a stirrer, and 400 parts (2 mol as caustic soda) of a 20% aqueous sodium hydroxide solution was added dropwise thereto to obtain sodium salts of para-cresol.

Next, 120 parts (4 mol) of paraformaldehyde was gradually added thereto while keeping the reaction temperature at 5° C. or lower in an ice bath. The mixture was reacted for 1 hour while keeping the reaction temperature at 5° C. or lower, and was then further reacted for 1 hour while increasing the temperature to 20° C.

The obtained reaction solution was cooled, concentrated hydrochloric acid was added dropwise thereto while keeping the temperature at 30° C., and it was confirmed with pH test paper that the mixture became neutral. This reaction solution was filtered, washed with water, and then dried to obtain 300 parts (yield of 89%) of a dimethylol body (DM-1) which was a target product.

Synthesis Example 2

378 Parts (3.5 mol) of para-cresol and 2 parts (0.012 mol) of para-toluenesulfonic acid were added to a four-neck flask equipped with a thermometer and a stirrer, and the temperature of the reaction solution was kept at 45° C. in a water bath. Next, 168 parts (1 mol) of DM-1 obtained in Synthesis Example 1 was gradually added thereto while keeping the reaction temperature at 45° C. in a water bath. The mixture was reacted for 5 hours while keeping the reaction temperature at 45° C., and was then further reacted for 1 hour while increasing the temperature to 80° C. 4 Parts (0.01 mol) of sodium tripolyphosphate was added to the obtained reaction solution, and the mixture was stirred for several minutes and washed with water. Then, it was confirmed with pH test paper that the system of the mixture became neutral. This solution was distilled under reduced pressure with a rotary evaporator to recover unreacted para-cresol, and 290 parts of a para-cresol novolac (P-1) was obtained. The GPC measurement results are shown in Table 1, and the evaluation results of the physical properties of the resins are shown in Table 2.

Synthesis Example 3

248 Parts of a para-cresol novolac (P-1), 777 parts (8.4 mol) of epichlorohydrin, 389 parts (5.0 mol) of dimethyl sulfoxide, and 79 parts of water were added to a four-neck flask equipped with a thermometer and a stirrer, and the temperature was raised to 70° C. in a water bath, 88 Parts (2.3 mol) of flaky sodium hydroxide was dividedly added thereto over 180 minutes when the internal temperature reached 70° C., and the mixture was reacted at 70° C. for 2 hours. The reaction solution was transferred to a separatory funnel, warm water was added thereto to wash the reaction solution with water, and the obtained solution was distillation under reduced pressure with a rotary evaporator to recover unreacted epichlorohydrin. The residue was dissolved in 914 parts (9.1 mol) of methyl isobutyl ketone, the temperature of the solution was raised to 70° C., and 25 parts of a 30 weight % aqueous sodium hydroxide solution (0.2 mol as sodium hydroxide) was added thereto to cause a reaction for 1 hour. Thereafter, the reaction solution was washed with water until a washing liquid became neutral. Methyl isobutyl ketone and the like were distilled off from the obtained solution under reduced pressure at 180° C. with a rotary evaporator to obtain 330 g of an epoxy resin (EP-1). The ICI viscosity (at 150° C.) of the obtained resin was 0.18 Pa·s, the softening point was 74° C., and the epoxy equivalent thereof was 226 g/eq. The evaluation results of the physical properties of the resins are shown in Table 2.

Synthesis Example 4

280 Parts of a naphthol-cresol novolac resin (OCN-7000 manufactured by Meiwa Plastic Industries, Ltd.), 677 parts (7.3 mol) of epichlorohydrin, and 8 parts (0.4 mol) of water were added to a four-neck flask equipped with a thermometer and a stirrer, and the temperature was raised to 45° C. in a water bath, 84 Parts (2.1 mol) of flaky sodium hydroxide was dividedly added thereto over 90 minutes when the temperature reached 45° C., and the mixture was reacted at 45° C. for 2 hours and further reacted at 70° C. for 1 hour. The reaction solution was transferred to a separatory funnel, warm water was added thereto to wash the reaction solution with water, and the obtained solution was distillation under reduced pressure with a rotary evaporator to recover unreacted epichlorohydrin. The residue was dissolved in 800 parts (8.0 mol) of methyl isobutyl ketone, the temperature of the solution was raised to 70° C., and 19 parts of a 30 weight % aqueous sodium hydroxide solution (0.1 mol as sodium hydroxide) was added thereto to cause a reaction for 1 hour. Thereafter, the reaction solution was washed with water until a washing liquid became neutral. Methyl isobutyl ketone and the like were distilled off from the obtained solution under reduced pressure at 180° C. with a rotary evaporator to obtain 351 g of an epoxy resin (EP-2). The ICI viscosity (at 150° C.) of the obtained resin was 1.3 Pa·s, the softening point was 95° C., and the epoxy equivalent thereof was 227 g/eq. The evaluation results of the physical properties of the resins are shown in Table 2.

Example 1

45 Parts of EP-1 obtained in Synthesis Example 3 and 55 parts of EP-2 obtained in Synthesis Example 4 were added to a four-neck flask equipped with a thermometer and a stirrer, the mixture was dissolved in 200 parts of methyl isobutyl ketone, and the solution was stirred for 2 hours while the temperature was raised to 100° C. After visually confirming that the solution became uniform, methyl isobutyl ketone was distilled off from the obtained resin solution under reduced pressure at 180° C. with a rotary evaporator to obtain 95 parts of an epoxy resin (EP-3) of the present invention. The ICI viscosity (at 150° C.) of the obtained resin was 0.59 Pa·s, the softening point was 86° C., and the epoxy equivalent thereof was 229 g/eq. The evaluation results of the physical properties of the resins are shown in Table 2.

Example 2

EP-1 obtained in Synthesis Example 3 and EP-2 obtained in Synthesis Example 4 were dissolved in 200 parts of methyl isobutyl ketone through the same process as in Example 1 except that the amounts of EP-1 and EP-2 were respectively changed to 40 parts and 60 parts, and methyl isobutyl ketone was distilled off from the obtained resin solution with a rotary evaporator to obtain 95 parts of an epoxy resin (EP-4) of the present invention. The ICI viscosity (at 150° C.) of the obtained resin was 0.66 Pa·s, the softening point was 87° C., and the epoxy equivalent thereof was 229 g/eq. The evaluation results of the physical properties of the resins are shown in Table 2.

Example 3

EP-1 obtained in Synthesis Example 3 and EP-2 obtained in Synthesis Example 4 were dissolved in 200 parts of methyl isobutyl ketone through the same process as in Example 1 except that the amounts of EP-1 and EP-2 were respectively changed to 35 parts and 65 parts, and methyl isobutyl ketone was distilled off from the obtained resin solution with a rotary evaporator to obtain 95 parts of an epoxy resin (EP-5) of the present invention. The ICI viscosity (at 150° C.) of the obtained resin was 0.69 Pa·s, the softening point was 88° C., and the epoxy equivalent thereof was 230 g/eq. The evaluation results of the physical properties of the resins are shown in Table 2.

Example 4

86 Parts of a naphthol-cresol novolac resin (OCN-7000 manufactured by Meiwa Plastic Industries, Ltd.), 54 parts of a para-cresol novolac (P-1) obtained in Synthesis Example 2, 415 parts (4.5 mol) of epichlorohydrin, and 8 parts (0.4 mol) of water were added to a four-neck flask equipped with a thermometer and a stirrer, and the temperature was raised to 70° C. in a water bath, 4 Parts (0.1 mol) of flaky sodium hydroxide was added thereto when the temperature reached 70° C., and the mixture was reacted at 70° C. for 2 hours. After the reaction, the reaction solution was cooled to 55° C., 389 parts (1.6 mol) of dimethyl sulfoxide was added thereto when the internal temperature reached 55° C., 41 parts (1.0 mol) of flaky sodium hydroxide was dividedly added thereto over 90 minutes when the internal temperature stabilized at 55° C., and the mixture was reacted at 55° C. for 2 hours and further reacted at 70° C. for 1 hour. The reaction solution was transferred to a separatory funnel, warm water was added thereto to wash the reaction solution with water, and the obtained solution was distillation under reduced pressure with a rotary evaporator to recover unreacted epichlorohydrin. The residue was dissolved in 390 parts (3.9 mol) of methyl isobutyl ketone, the temperature of the solution was raised to 70° C., and 11 parts of a 30 weight % aqueous sodium hydroxide solution (0.1 mol as sodium hydroxide) was added thereto to cause a reaction for 1 hour. Thereafter, the reaction solution was washed with water until a washing liquid became neutral. Methyl isobutyl ketone and the like were distilled off from the obtained solution under reduced pressure at 180° C. with a rotary evaporator to obtain 178 g of an epoxy resin (EP-6) of the present invention. The ICI viscosity (at 150° C.) of the obtained resin was 0.50 Pa·s, the softening point was 85° C., and the epoxy equivalent thereof was 216 g/eq. The evaluation results of the physical properties of the resins are shown in Table 2.

Examples 5 and 6 and Comparative Examples 1 to 3

The epoxy resins (EP-1, 2, 4, and 6) obtained in Synthesis Examples 3 and 4 and Examples 2 and 4 and an ortho-cresol novolac epoxy resin EOCN-104S (manufactured by Nippon Kayaku Co., Ltd., softening point of 92° C., ICI viscosity (at 150° C.) of 3.0 Pa·s, and epoxy equivalent of 217 g/eq.) which were used as main agents, a phenol novolac (at a softening point of 83° C. and a hydroxyl equivalent of 106 g/eq.) which was used as a curing agent, and triphenylphosphine (TPP) which was used as a curing promoter were mixed with each other at weight ratios shown in the formulation compositions of Table 3, and were cured under the curing conditions of 160° C. for 2 hours and 180° C. for 6 hours.

Examples 7 and 8 and Comparative Examples 4 to 6

The epoxy resins (EP-1, 2, 4, and 6) obtained in Synthesis Examples 3 and 4 and Examples 2 and 4 and a dicyclopentadiene epoxy resin XD-1000 (manufactured by Nippon Kayaku Co., Ltd., softening point of 73° C., ICI viscosity (at 150° C.) of 0.20 Pa·s, and epoxy equivalent of 253 g/eq.) which were used as main agents, 3,3',5,5'-tetraethyl-4,4'-diaminodiphenylmethane (abbreviation; TEDDM, manufactured by Tokyo Chemical Industry Co., Ltd., active hydrogen equivalent of 78 g/eq.) which was used as a curing agent, and salicylic acid (manufactured by Junsei Chemical Co., Ltd., special grade) which was used as a curing promoter were mixed with each other at weight ratios shown in the formulation compositions of Table 4, and were cured under the curing conditions of 160° C. for 6 hours.

Example 9

The epoxy resin (EP-4) obtained in Example 2 which was used as a main agent, 4,4'-diaminodiphenyl sulfone (abbreviation; Seikacure-S, manufactured by Seika Corporation, active hydrogen equivalent of 62 g/eq.) which was used as a curing agent, and salicylic acid (manufactured by Junsei Chemical Co., Ltd., special grade) which was used as a curing promoter were mixed with each other at weight ratios shown in the formulation compositions of Table 5, and were cured under the curing conditions of 160° C. for 6 hours.

The physical property values were measured under conditions as follows.

<Heat Resistance (Tg) Measurement Conditions>

Dynamic viscoelasticity measuring device: TA-instruments, DMA-2980

Measurement temperature range: −30° C. to 280° C.

Temperature increase rate: 2° C./minute

Elastic modulus: Storage elastic modulus at 50° C.

Tg: The peak point of Tan δ was regarded as Tg.

<Measurement Conditions for Bending Strength and Flexural Modulus>

These were measured according to JIS K-7074.

<Measurement Conditions for Water Absorption Rate>

The weights of a disk-like test piece having a diameter of 5 cm and a thickness of 4 mm before and after boiling the disk-like test piece in water at 100° C. for 72 hours were measured, and the increase rate (%) thereof was regarded as a water absorption rate.

TABLE 1

|  | n = 1 | n = 2 | n = 3 | n = 4 | n = 5 | n = 6 or more |
|---|---|---|---|---|---|---|
| P-1 [% by area] | 4.7 | 46.0 | 9.7 | 17.5 | 6.7 | 15.5 |

TABLE 2

|  |  | EP-1 | EP-2 | EP-3 | EP-4 | EP-5 | EP-6 |
|---|---|---|---|---|---|---|---|
| ICI Viscosity (at 150° C.) | [Pa·s] | 0.18 | 1.3 | 0.59 | 0.66 | 0.69 | 0.50 |
| Softening point | [° C.] | 74 | 95 | 86 | 87 | 88 | 85 |
| Epoxy equivalent | [g/eq.] | 226 | 227 | 229 | 229 | 230 | 216 |

TABLE 3

| Formulation composition table | | Example 5 | Example 6 | Comparative Example 1 | Comparative Example 2 | Comparative Example 3 |
|---|---|---|---|---|---|---|
| Epoxy resin | EP-1 | | | 80 | | |
| | EP-2 | | | | 80 | |
| | EP-4 | 80 | | | | |
| | EP-6 | | 80 | | | |
| | EOCN-104S | | | | | 80 |
| Curing agent | Phenol novolac | 37 | 40 | 38 | 38 | 39 |
| Curing promoter | TPP | 1 | 1 | 1 | 1 | 1 |
| Cured product properties | Bending modulus of elasticity [GPa] | 3.6 | 3.6 | 3.7 | 3.6 | 3.2 |
| | Bending strength [MPa] | 95 | 87 | 62 | 79 | 68 |
| | Tg (DMA) [° C.] | 204 | 205 | 191 | 204 | 160 |
| | Water absorption rate [%] | 1.1 | 1.1 | 1.2 | 1.0 | 1.4 |

TABLE 4

| Formulation composition table | | Example 7 | Example 8 | Comparative Example 4 | Comparative Example 5 | Comparative Example 6 |
|---|---|---|---|---|---|---|
| Epoxy resin | EP-1 | | | 80 | | |
| | EP-2 | | | | 80 | |
| | EP-4 | 80 | | | | |
| | EP-6 | | 80 | | | |
| | XD-1000 | | | | | 80 |
| Curing agent | TEDDM | 27 | 29 | 28 | 27 | 25 |
| Curing promoter | Salicylic acid | 2 | 2 | 2 | 2 | 2 |
| Cured product properties | Bending modulus of elasticity [GPa] | 3.3 | 3.3 | 3.1 | 3.1 | 2.5 |
| | Bending strength [MPa] | 68 | 65 | 69 | 68 | 87 |
| | Tg (DMA) [° C.] | 212 | 217 | 195 | 220 | 208 |
| | Water absorption rate [%] | 1.2 | 1.2 | 1.3 | 1.2 | 1.0 |

TABLE 5

| Formulation composition table | | Example 9 |
|---|---|---|
| | EP-4 | 40 |
| Curing agent | 4,4'-DDS | 14 |
| Curing promoter | Salicylic acid | 1 |
| Cured product properties | Bending modulus of elasticity [GPa] | 3.7 |
| | Tg (DMA) [° C.] | 238 |
| | Water absorption rate [%] | 1.4 |

From the results of Tables 3 to 5, it was confirmed that all the cured products of the examples of the present application had excellent flexural modulus, heat resistance (Tg), and low water absorption rate.

INDUSTRIAL APPLICABILITY

The epoxy resin mixture of the present invention has excellent heat resistance, elastic modulus, low water absorptivity, and flame retardancy. Therefore, the epoxy resin mixture of the present invention is useful for a carbon fiber-reinforced composite material. The carbon fiber-reinforced composite material in which the epoxy resin mixture of the present invention is used is lightweight and has an excellent resistance to external impact, and therefore, can be suitably used for many structural materials such as aircraft members such as a fuselage, main wings, tails, rotor blades, fairings, cowls, doors, seats, and interior materials; spacecraft components such as motor cases and main wings; artificial satellite components such as structures and antennas; automotive components such as outer plates, chassis, aerodynamic components, and seats; railway vehicle components such as structures and seats; and ship components such as hulls and seats.

The invention claimed is:
1. An epoxy resin mixture which contains an epoxy resin represented by Formula (1) below and an epoxy resin represented by Formula (2) below at a weight ratio of 1:5 to 1:0.2,

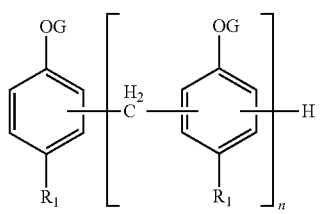
(1)

in Formula (1), plural $R_1$'s each exist independently and represent a hydrogen atom or a C1-10 alkyl group, n represents a real number of 1 to 10, and G represents a substituted or unsubstituted glycidyl group, and

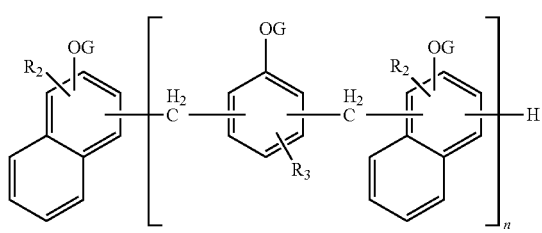
(2)

in Formula (2), plural $R_2$'s and $R_3$'s each exist independently and represent a hydrogen atom or a C1-10 alkyl group, n represents a real number of 1 to 10, and G represents a substituted or unsubstituted glycidyl group, wherein the epoxy resin mixture is obtained through a reaction between a phenolic resin represented by Formula (3) below, a phenolic resin represented by Formula (4) below, and an epihalohydrin,

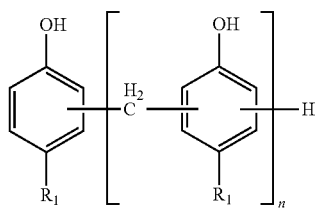
(3)

in Formula (3), plural $R_1$'s each exist independently and represent a hydrogen atom or a C1-10 alkyl group, and n represents a real number of 1 to 10, a total content of a component represented by n=1 and a component represented by n=3 as measured by gel permeation chromatography is greater than or equal to 1% by area and less than 20% by area, a total content of a component represented by n=2 and a component represented by n=4 as measured by gel permeation chromatography is greater than or equal to 25% by area and less than 80% by area, and

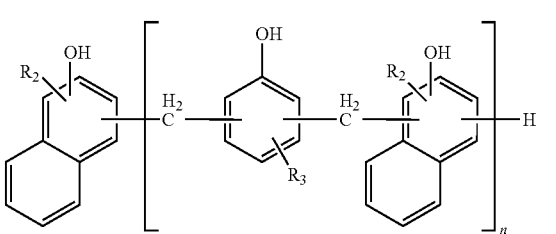
(4)

in Formula (4), plural $R_2$'s and $R_3$'s each exist independently and represent a hydrogen atom or a C1-10 alkyl group, and n represents a real number of 1 to 10.

2. An epoxy resin composition comprising:
the epoxy resin mixture according to claim 1; and
a curing agent.

3. The epoxy resin composition according to claim 2,
wherein the curing agent is an amine-based curing agent.

4. The epoxy resin composition according to claim 2, which is for a carbon fiber-reinforced composite material.

5. A resin sheet obtained by coating a support substrate with the epoxy resin composition according to claim 2.

6. A prepreg obtained by impregnating the resin sheet according to claim 5 into carbon fibers.

7. A carbon fiber-reinforced composite material obtained by curing the prepreg according to claim 6.

8. A prepreg obtained by impregnating the epoxy resin composition according to claim 2 into carbon fibers.

9. A carbon fiber-reinforced composite material obtained by curing the prepreg according to claim 8.

* * * * *